INVENTOR
JOHN J. HUNTER
ATTORNEY

Sept. 11, 1973  J. J. HUNTER  3,758,361
PROCESS FOR LINING PIPE JOINTS
Filed Nov. 16, 1970  2 Sheets-Sheet 2

INVENTOR
JOHN J. HUNTER

Jack A Kaus
ATTORNEY

United States Patent Office 3,758,361
Patented Sept. 11, 1973

3,758,361
PROCESS FOR LINING PIPE JOINTS
John J. Hunter, 1801 N. Willis, Abilene, Tex.
Filed Nov. 16, 1970, Ser. No. 89,639
Int. Cl. B29c 17/04; B32b 31/20
U.S. Cl. 156—287                                              7 Claims

ABSTRACT OF THE DISCLOSURE

Disclosed is a process for bonding plastic liners in metal pipe joints. The bore of the pipe and the exterior of a tubular liner are coated with a thermal adhesive, the liner inserted into the pipe bore, and the liner heated internally by passing steam through the liner under pressure. The flow of steam through the liner is controlled to cause heating of the liner to progress axially from one end of the pipe. The liner is then expanded to intimately contact and bond to the bore of the pipe by pressurizing the liner while hot.

---

This invention relates to methods and apparatus for producing plastic-lined pipe or conduit commonly used for handling acids, caustics, salt water and other corrosive fluids. More particularly, it relates to methods and apparatus for securing plastic liners within joints of threaded or non-threaded pipes and for coating the end facings of said plastic-lined pipes to provide means for effecting a fully lined conduit when the joints of said pipe are joined.

Plastic-lined pipes have long been used for conducting acids, caustics, salt water and other corrosive fluids which cause deterioration of metal pipes. It is difficult, however, to form a plastic coating over the entire inner surface of a conduit and thereby totally prevent exposure of the metal to fluid being conducted therethrough, particularly at the junctions between two joints of pipe. An effective method for lining threaded pipe joints whereby coupled ends of such joints are protected with a plastic facing is disclosed in U.S. Pat. No. 3,422,856 to John J. Hunter et al.

In accordance with the present invention, plastic liners may be placed in both threaded and non-threaded pipe joints. The liner may also be flared radially to provide flanges covering the end facings of threaded pipe, and may be expanded to cover portions of the exterior surface of non-threaded pipe. A plastic liner is adhesively bonded to the interior wall of a pipe joint by heating the plastic liner internally with steam to expand and soften the liner and bond it to the pipe joint. In accordance with this method the heat is applied directly to the plastic liner and a bond quickly formed between the metal pipe and the plastic liner. By heating the plastic liner internally with steam heat may be applied directly to the plastic, thereby avoiding the time consuming process of heating the entire pipe externally. Furthermore, by applying steam under pressure to the interior of the liner, the plastic liner is readily conformed to the internal dimensions of the pipe, thereby forming an adherent bond to the entire inner surface of the pipe. Accordingly, the method may be effectively used to bond plastic liners in both threaded and non-threaded pipe joints. Other features and advantages of the invention will become more readily understood from the following detailed description taken in connection with the appended claims and attached drawings in which:

Figure 1:
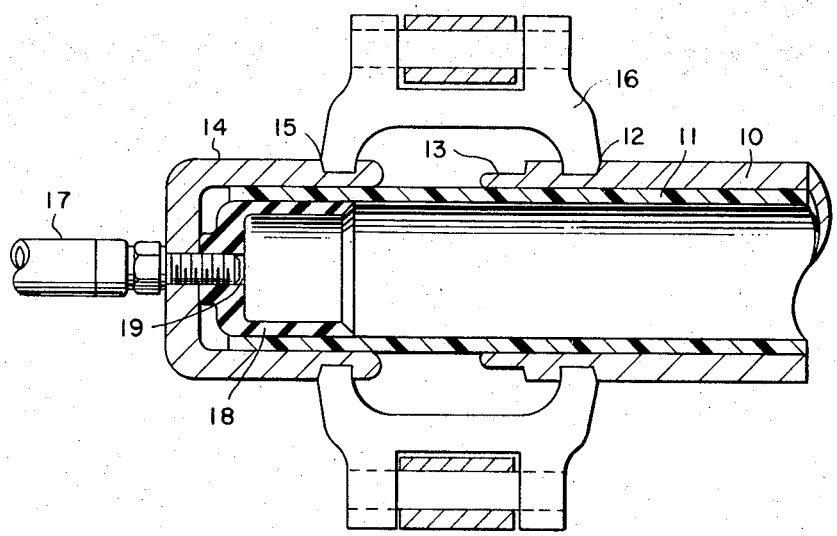
FIG. 1 is a sectional view of a non-threaded pipe joint and apparatus for installing a plastic liner therein in accordance with the invention.

Referring now to the drawings, wherein like numerals designate like parts, the numeral 10 designates a joint of steel pipe or the like which is to form the ouside reinforcing body of the lined pipe or conduit made in accordance with the invention. Joint 10, as illustrated in the drawings, does not have threaded couplings but has an annular groove 12 in its outer surface spaced from the end of the joint. Interconnection of two joints is accomplished using the grooves 12 and standard clamp means. The outer surface of the end of joint 10 is also slightly recessed to form an annular end portion of reduced outside diameter.

The length of the annular depression 13 may vary with the size of pipe and the type of sealing gasket used in connection therewith. Accordingly, the length of annular depression 13 may be from less than one-fourth inch to more than several inches. Likewise, the depth of depression 13 will vary with the size of the pipe and thickness of liner to be used.

Groove 12 and depression 13 may be produced by conventional methods such as machining, or may be produced by rolling processes as are known in the art. With the exception of the reduced end portion the joint, prior to the installation of the plastic liner in accordance with the principles of this invention, may be any conventional joint provided with an annular groove by means of which the ends of such joints are joined and sealed. For example, annular groove 12 is ordinarily referred to as a Victaulic groove adapted to mate with conventional Victaulic clamps which join and seal the ends of adjacent joints.

Prior to placing a plastic liner within the joint 10, the bore of the pipe 10 is thoroughly cleaned and slightly roughened. The bore is preferably cleaned by heating the pipe for approximately one hour at a temperature of about 750° F. to remove the gases from the pores of the pipe. The pipe is thereafter vibrated to remove all loose scale, rust and the like and then sandblasted to clean the entire bore of the pipe and provide a slightly roughened or pitted surface.

After the pipe is thoroughly cleaned and sandblasted as described above, the interior surface of the pipe is covered with a thermal type epoxy cement, such as Ap-1000 Resin Adhesive or some other suitable plastic-to-metal bonding agent. The bore of the pipe may be coated, for example, with epoxy cement by passing a gun, not illustrated, through the pipe while spraying the coating onto the entire inner surface. This same cement is simultaneously applied to the outer surface of the annular depression 13. The cement coating is then allowed to cure to a substantially dry state.

A preformed extruded cylindrical tubular lining 11 formed of a thermoplastic, preferably polyvinylchloride (PVC), is provided with a coating along its exterior surface of the same epoxy cement described above. This coating may be accomplished by dipping, spraying or other convenient conventional methods. The coating is then allowed to cure or dry. Liner 11 is then inserted telescopically within pipe joint 10, the ends of line 11 extending from the ends of joint 10.

In the preferred embodiment of the invention thermoplastic liner 11 has an outer diameter approximately 0.060 to 0.090 inch smaller than the inner diameter of joint 10, thereby facilitating easy insertion of the liner 11 within joint 10.

An end cup 14 having an annular groove 15 near one end thereof and having inner dimensions substantially conforming to the inner diameter of joint 10 is positioned over the open end of liner 11 extending from one end of joint 10. End cup 14 is secured in place by clamp 16 adapted to mate with groove 12 in joint 10 and groove 15 in cup 14. The clamp 16 which joins end cup 14 with the end of joint 10 forms a cavity surrounding that portion of the liner 11 between cup 14 and the end of joint 10. Supported within cup 14 is a tubular sealing sleeve 18. Sleeve 18 is approximately the same length as the cavity within cup 14 and is preferably made of a pliable substance such as neoprene rubber or the like. The outer diameter of sleeve 18 substantially conforms to the inner diameter of liner 11 and the inner diameter of cup 14 substantially conforms to the outer dimensions of the liner. Accordingly, the end of liner 11 may be inserted concentrically within the cup 14 between the inner wall of cup 14 and the outer surface of sleeve 18. The end of sleeve 18 within the liner 11 is open. The opposite end thereof has an opening 19 in communication with an inlet line 17.

A second end cup 20 is secured to the opposite end of liner 11 and the opposite end of joint 10 by clamp means 16 mating with grooves 12 in the joint and groove 21 in the second end cup 20. The second end cup 20 is substantially the same as end cup 14. An outlet line 27 passing through end cup 20 is in fluid communication with the interior of the liner 11 and provided with a valve 26 to control the flow of gas through the liner.

Figure 2:
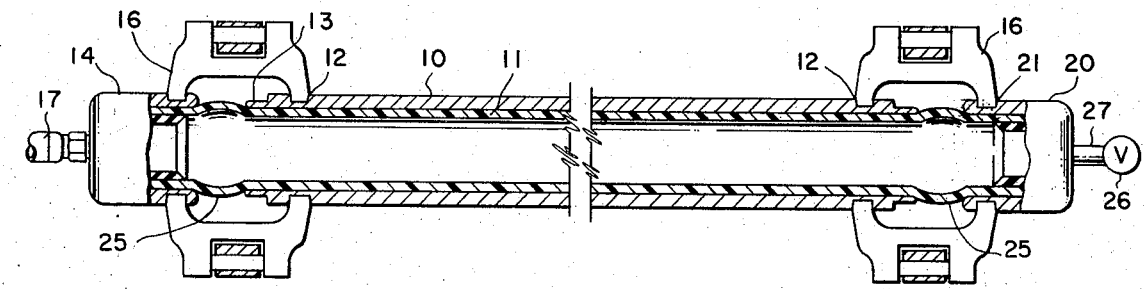
FIG. 2 is another sectional view of the pipe joint and apparatus of FIG. 1 during an intermediate step of the process of the invention.

With the liner 11 installed in the pipe and the pipe joint installed in the apparatus as shown in FIGS. 1 and 2, steam is introduced into the interior of sleeve 11 through inlet line 17. The steam is introduced at a temperature of between 250° F. and 275° F. The injected steam, however, is not dispersed in the air within the liner. Instead the escape of air from the liner is controlled by valve 26 to maintain the pressure within the liner at about 25–30 p.s.i. while allowing the steam to traverse the length of the pipe at a rate of about 10 feet per minute. With the injection of steam and escape of air controlled in this manner, the liner is heated by a column of steam passing axially through the liner. It will thus be observed that the liner 11 is rapidly raised to a temperature of about 250°–275° C. at the end adjacent end cap 14. The heated portion is then expanded toward the opposite end as the steam moves through the liner until the entire liner is heated to the same temperature. Steam will then begin escaping from valve 26.

When heated the thermoplastic liner 11 becomes soft and fuses with the thermal epoxy cement between the liner and joint 10 thereby causing intimate fusing and bonding of the liner to the metal pipe bore throughout the entire interior surface of pipe 10. Furthermore, since the liner 11 becomes soft and pliable, those portions of the liner 11 between the ends of pipe joint 10 and the end cups 14 and 20 become distorted and form bulges 25 within the cavities of clamps 16. When the full length of the liner has been heated as described above and steam begins escaping from valve 26, the flow of steam is stopped and compressed air or a mixture of steam and compressed air is injected into inlet 17. The pressure within the cavity is then raised to about 120 p.s.i. by closing or appropriately controlling valve 26. As the pressure within the liner is increased the liner 11 expands to fill the entire cavity within clamp 16. Accordingly, it will be observed that as liner 11 expands to fill the cavity, the plastic is folded backwardly over the depression 13 in pipe 10 and likewise forms a continuous intimate bond thereto. It will be observed that liner 11 not only covers the interior surface of pipe 10, but flares radially outwardly to cover the ends thereof and extends over the outer surface of depression 13. Likewise, due to the pressure within the liner, the liner expands to completely conform to the bore of pipe 10 and is intimately fused and bonded thereto.

It should be observed that during the heating step, steam is passed through the liner and contacts the liner only in the area between the end cup 14 and the column of air filling the liner. As the air is forced from the liner, the heated area is expanded, thereby moving the heated zone axially through the joint in a smooth continuous operation.

Figure 4:
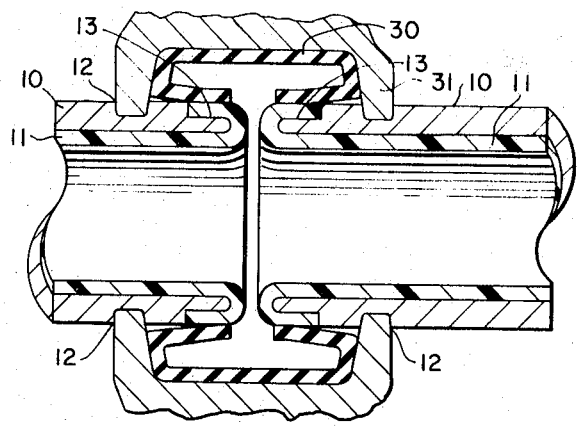
FIG. 4 is a sectional view of the junction formed between two plastic-lined non-threaded pipe joints formed in accordance with the invention.

After the heating and bonding step described above, the entire assembly is allowed to cool. The pressure within the liner is then relieved and the clamps 16 removed. The ends of plastic liner 11 extending backwardly over the exterior surface of the pipe past the reduced end portions 13 are then cut away leaving the plastic liner covering only the inner surface of the pipe, the end facings of the pipe, and the reduced end portion as illustrated in FIG. 4. It will thus be observed that the entire inner surface of pipe 10 is now coated with a thermoplastic liner which extends through the entire bore of the pipe, flares radially outwardly over the ends of the pipe, and is folded backwardly over the outer surface of the pipe covering the reduced end portions thereof adjacent the ends. A portion of the outer surface of the pipe, however, between the annular groove and the ends thereof is now covered with the plastic liner 11.

Figure 3:
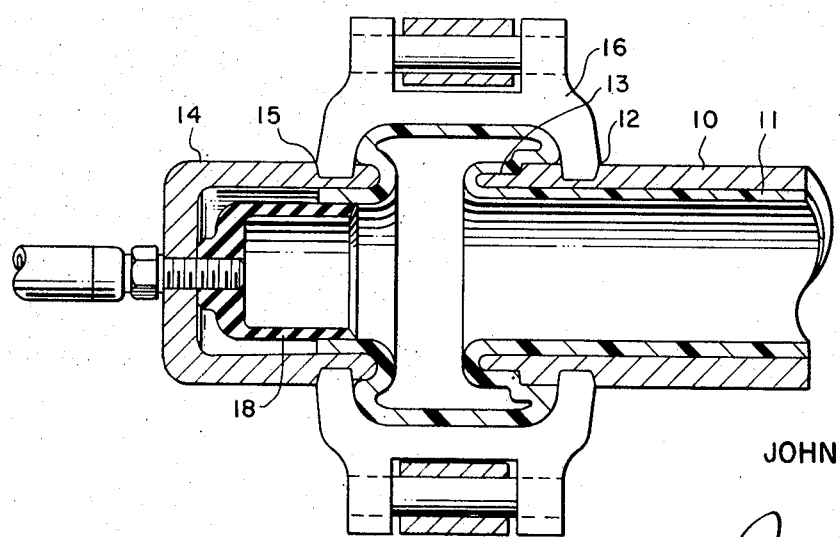
FIG. 3 is a sectional view of the pipe joint and apparatus of FIG. 1 after the bonding and expansion steps of the process have been performed in accordance with the invention.

It will be observed that as the liner 11 expands to fill the cavity within the clamps 16, the open ends of liner 11 will be partially withdrawn from the end cups 14 and 20 as shown in FIG. 3. Accordingly, cups 14 and 20 should be sufficiently deep to maintain a sealing relationship with liner 11 and yet allow the ends of the liner to be withdrawn a sufficient distance to fill the cavities in clamps 16 as shown in FIG. 3. Care should also be taken to avoid sharp edges on the end faces of the pipe and the end cups. Since liner 11 is expanded into the cavity in clamps 16 in a soft state, any sharp edges extending into the cavity may tend to cut the liner. Accordingly, the end faces of the pipe joint 10 and cups 14 and 20 are preferably somewhat rounded to provide a surface over which a soft liner may be drawn without cutting the liner.

The depth of the recessed end portion 13 relative to the outside diameter of the joint 10 is preferably determined by the thickness of the liner to be bonded to the pipe. For example, if a plastic liner 0.060 inch thick is to be bonded to the pipe, the outside diameter of end portion 13 should be approximately 0.120 inch less than the outside diameter of the pipe. Therefore, when the liner 11 is folded over the outside of the recessed end portion, the liner will substantially fill the recess and the outer surface of the pipe 10 will be substantially coplanar with the outer surface of the plastic covering the recessed end portions 13.

Coupling of two joints of pipe 10 containing plastic liner 11 applied as described hereinabove is illustrated in FIG. 4. The ends of the two joints 10 are placed in abutting relationship and an annular gasket 30 positioned around the abutting ends of joint 10. A conventional clamp 31, such as a Victaulic clamp, adapted to mate with the connecting grooves 12 is secured around gasket 30, the clamp 31 fitting within grooves 12 to rigidly secure the joints 10 in a fixed relation and applying sufficient pressure to gasket 30 to seal the junction between the joints. It will be observed, however, that gasket 30, formed of conventional materials such as neoprene rubber or the like, is urged into contact with and forms a seal with that portion of plastic liner 11 which is wrapped around and secured to the reduced end portion 13 of joint 10. Accordingly, it will be observed that even though the ends of joints 10 are not forced into abutting sealing relationship, the seal formed by gasket 30 is formed with that portion of plastic liner 11 overlying the reduced end portion 13 of pipe joints 10. Fluid passing through the conduit formed by joints 10 is prevented from ever contacting any metal portion of the conduit.

Figure 5:
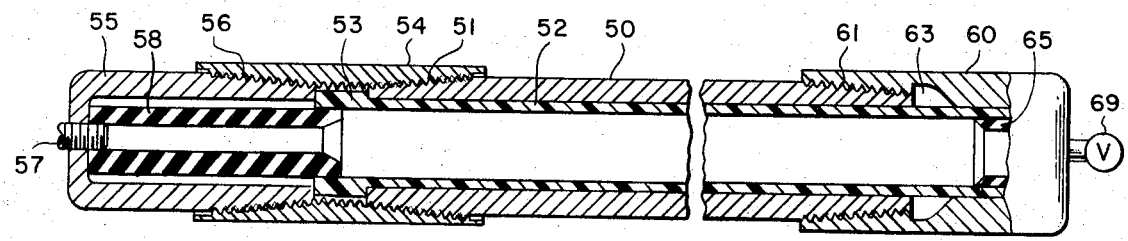
FIG. 5 is a sectional view of a threaded pipe joint and apparatus for inserting a plastic liner therein in accordance with the invention.
Figure 6:
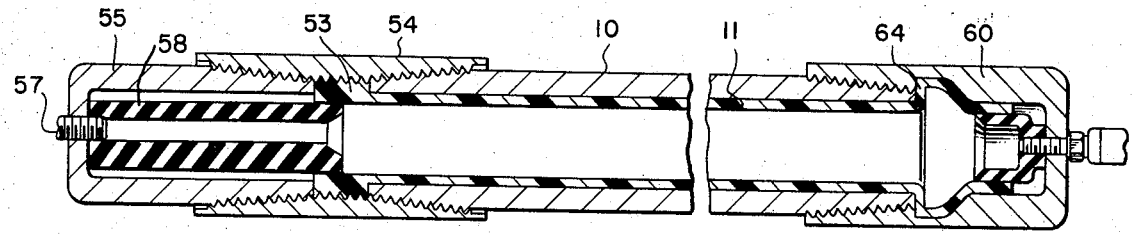
FIG. 6 is a sectional view of the apparatus and pipe section of FIG. 5 illustrating the condition of the liner at an intermediate stage of the process.
Figure 7:
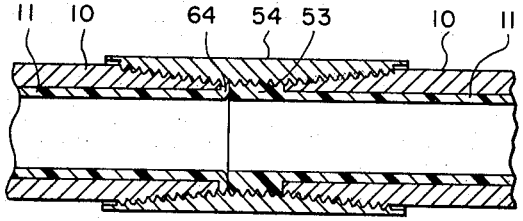
FIG. 7 is a sectional view of a junction between two joints of threaded pipe lined with a plastic liner formed in accordance with the principles of this invention.

The process of the invention may likewise be used to provide plastic liners in threaded pipe joints as illustrated in FIGS. 5, 6, and 7. For example, a threaded pipe joint, illustrated at 50, having standard tapered threads 51 at both ends thereof, is cleaned and the bore thereof coated with an epoxy cement as described hereinabove. A coupling sleeve 54 having matching tapered threads is secured to one end of the joint 50.

A preformed extruded cylindrical tubular liner 52 formed of a thermoplastic, preferably PVC, having expanded collar 53 at one end thereof is likewise coated with the same epoxy cement and telescopically inserted within the joint 50. As shown in the drawings, the expanded collar 53 is adapted to fit within the coupling sleeve 54 and abuts the end of the pipe 50 within the sleeve 54.

Liner 52 is secured in place within the joint 50 by end piece 55 which has tapered male threads 56 mating with the threads in coupling sleeve 54. End piece 55 is screwed into the coupling sleeve 54 until the end thereof abuts the collar 53 on liner 52, thereby enclosing the open end of the liner 52. An inlet port 57 is provided in end piece 55 to permit injection of steam into the system.

Inlet port 57 communicates with the bore inside the liner 52 through a sealing sleeve 58 such as described hereinabove with reference to FIG. 1.

The opposite end of joint 50 is enclosed by end piece 60 which has female threads 61 mating with the tapered male threads on joint 50. End cap 60 is provided with a tubular sealing sleeve 65 as described hereinabove with reference to FIG. 1. Liner 52 extends completely through the joint 50 and into the end piece 60 as illustrated in FIG. 5.

The internal diameter of end piece 60 at the end opposite threads 61 is approximately the same as the outer diameter of the liner 52 so that the end of the liner fits therein. The internal diameter of end piece 60 is greater at the point adjacent the end of the joint 50 so that a cavity 63 is formed within the cap 60 surrounding the liner 52 at the end of joint 50.

Steam at a temperature of about 250° to about 275° F. is injected into the liner 52 through inlet 57 and the pressure within the liner maintained at about 25 to 30 p.s.i. by controlling the flow through valve 69. As described above, the heated zone moves axially through the length of the liner at a rate of about 10 feet per minute by controlling the escape of air through valve 69. As described hereinabove, the softened plastic liner is fused and intimately bonded to the bore of the pipe 50.

When the heated zone moves into end cap 60, that portion of liner 52 extending into end cap 60 is heated and allowed to expand within cavity 63. It will be observed that as liner 52 expands to fill the cavity 63 the liner flares radially covering the end facing of the pipe joint 50 forming a radial flange 64.

When the heated zone has traversed the full length of the liner and the entire liner is heated to about 250° to about 275° F., compressed air is injected into the liner via inlet 57 to raise the pressure to approximately 120 p.s.i. The soft plastic liner is thereby expanded to conform to the bore of the pipe joint 50 and is intimately bonded thereto.

Upon completion of the bonding step the entire apparatus is allowed to cool and pressure relieved as described hereinabove. End caps 55 and 60 are removed and the portion of liner 11 extending past flange 64 is removed leaving a radially flared end covering 64 firmly and intimately bonded to the end facing of pipe joint 50.

FIG. 7 illustrates a typical coupling of two joints of plastic-lined pipe produced in accordance with the invention as described above. Coupling sleeve 54 remains attached to one end of the joint and contains collar portion 53. The opposite end of sleeve 54 receives the male end of joint 50 having the annular sealing flange 64. The joint is drawn into sleeve 54 until the flange 64 directly abuts the opposing end of thickened collar portion 53. The collar 53 and flange 64 are axially compressed to provide a fluid-tight seal at their annular mating faces, thereby providing a continuously plastic-lined conduit.

From the foregoing it will be observed that utizing the teachings of this invention, plastic liners may be readily adherently bonded within the bore of threaded and non-threaded pipe without heating the pipe externally. Accordingly, the process of this invention permits the rapid processing of pipe by avoiding the time required to heat and cool massive pipe joints.

While the invention has been described with particular reference to specific embodiments thereof, it is to be understood that the forms of the invention shown and described in detail are to be taken as preferred embodiments of same, and that various changes and modifications may be resorted to without departing from the spirit and scope of the invention as defined by the appended claims.

What is claimed is:

1. The method of forming a lined pipe joint comprising the steps of:
   (a) applying a thermal adhesive to the bore of a metal pipe joint and to the external surface of a thermal plastic liner;
   (b) inserting said liner within the bore of said joint;
   (c) enclosing the ends of said liner;
   (d) injecting steam into said liner to maintain a pressure therein of about 25 to about 30 p.s.i. and to heat said liner to a temperature of about 250° to about 275° F.; and
   (e) increasing said pressure within said liner to about 120 p.s.i., thereby expanding said liner to contact the bore of said liner joint and fusing and bonding said liner to the bore of said pipe joint.

2. The method set forth in claim 1 wherein said steam is passed through said liner at a rate of about 10 feet per minute.

3. The method of forming a plastic-lined pipe joint comprising the steps of:
   (a) applying a thermal adhesive to the bore of said pipe joint and to the exterior of a thermoplastic liner, said liner being substantially tubular and having a radially enlarged collar adjacent one end thereof;
   (b) inserting said liner into the bore of said pipe with said collar portion abutting one end face of said pipe and the opposite end of said liner projecting from the opposite end of said pipe;
   (c) applying a coupling sleeve to the end of said pipe adjacent said collar;
   (d) enclosing the end of said coupling sleeve;
   (e) injecting steam into said coupling sleeve;
   (f) moving said steam through the bore of said liner while maintaining a steam pressure of about 30 p.s.i. within said liner until the temperature of the entire liner is about 250° to about 275° F.; and
   (g) increasing the pressure within said liner to about 120 p.s.i., thereby expanding said liner and causing said liner to flare radially outwardly over the end facing of said pipe opposite said collar portion.

4. The method set forth in claim 3 wherein said steam is moved through said liner at a rate of about ten feet per minute.

5. The method of securing a plastic liner within the bore of a non-threaded pipe joint comprising the steps of:
   (a) applying a thermal adhesive to the bore of said pipe joint and to the exterior of a tubular thermoplastic liner;
   (b) inserting said liner within the bore of said pipe joint, the ends of said liner projecting from the ends of said pipe joint;

(c) attaching end caps to the ends of said liner;
(d) securing said end caps to the ends of said pipe joint with means providing a cavity surrounding the portion of said liner between the end cap and the respective ends of said pipe joint;
(e) passing steam through the bore of said liner while maintaining the pressure within said liner at about 30 p.s.i., thereby to heat said liner to a temperature of about 250° to about 275° F.; and
(f) increasing the pressure within said liner to about 120 p.s.i. to expand the portion of said liner between the end cap and the respective ends of said joint to substantially conform to said cavity, thereby causing said liner to bond to the bore of said joint, to the end faces of said joint, and to portion of the external surface of said joint near the end thereof.

6. The method set forth in claim 5 wherein said liner is expanded by increasing the pressure within said liner to about 120 p.s.i. while the temperature of said liner is 250° F. to about 275° F.

7. The method set forth in claim 5 wherein said steam is passed through said liner at a rate of about 10 feet per minute, thereby causing a heated zone to traverse the length of said liner at a rate of about 10 feet per minute.

References Cited

UNITED STATES PATENTS

| | | | |
|---|---|---|---|
| 3,381,718 | 5/1968 | Darrow | 156—287 |
| 3,258,377 | 6/1966 | Scott | 156—287 |
| 2,724,672 | 11/1955 | Rubin | 156—287 |
| 3,307,996 | 3/1967 | Keneipp | 156—287 |
| 3,422,856 | 1/1969 | Hunter et al. | 138—143 |
| 3,511,734 | 5/1970 | Darrow | 156—287 |
| 3,602,945 | 9/1971 | Pope et al. | 156—287 |

WILLIAM D. MARTIN, Primary Examiner

M. SOFOCLEOUS, Assistant Examiner

U.S. Cl. X.R.

156—294, 158; 138—140, 143, 155; 285—47, 53; 29—157